United States Patent [19]

Spisak

[11] 4,210,367
[45] Jul. 1, 1980

[54] WHEEL TRIM ASSEMBLY

[76] Inventor: Edward G. Spisak, 35700 Oakwood La., Westland, Mich. 48185

[21] Appl. No.: 958,010

[22] Filed: Nov. 6, 1978

[51] Int. Cl.² .............................................. B60B 7/00
[52] U.S. Cl. ............................... 301/37 R; 24/213 C; 24/73 HC; 24/215; 403/243
[58] Field of Search ............... 24/73 HC, 213 C, 214, 24/215; 301/37 R, 37 P, 37 C, 37 CD, 37 TP, 37 B, 108 R, 108 A; 52/511, 512; 403/405, 406, 243

[56] References Cited

U.S. PATENT DOCUMENTS

| 2,212,038 | 8/1940 | Lyon | 301/37 P |
| 2,360,647 | 10/1944 | Churchill | 24/214 |
| 2,864,472 | 12/1958 | Fernberg | 52/511 |
| 3,894,775 | 7/1975 | Christoph | 301/37 P |

FOREIGN PATENT DOCUMENTS 474512 6/1951 Canada ................................... 24/215

Primary Examiner—H. Grant Skaggs
Attorney, Agent, or Firm—Fisher, Gerhardt, Crampton & Groh

[57] ABSTRACT

A wheel trim assembly for attachment to vehicle wheels including a mounting member and a cup-shaped decorative trim member wherein the mounting member supports a plurality of resilient retainers formed of wire such that the resiliency of the retainers holds them in position on the mounting member. The retainers cooperate with holes in the vehicle wheel to hold the mounting member and the attached wheel trim member to the vehicle wheel.

9 Claims, 5 Drawing Figures

U.S. Patent   Jul. 1, 1980   4,210,367
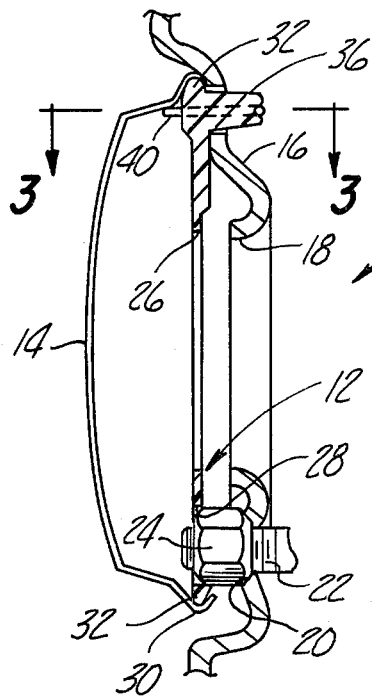
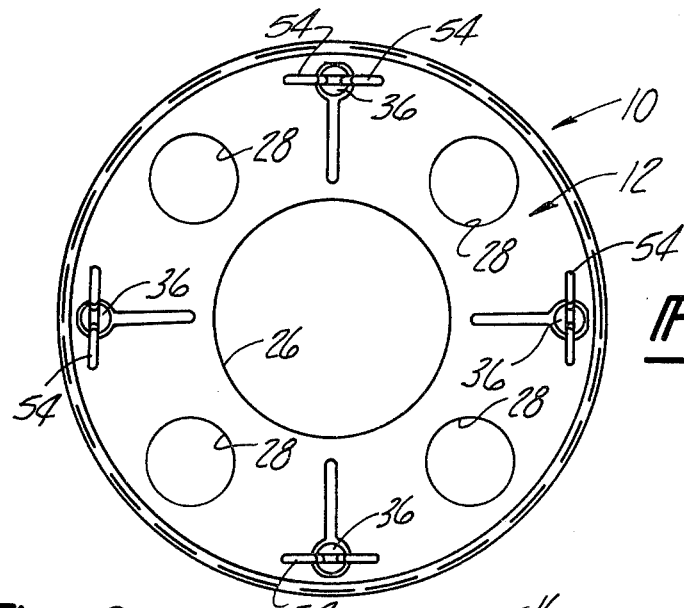
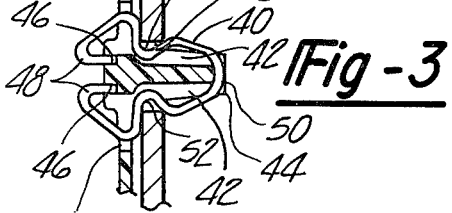
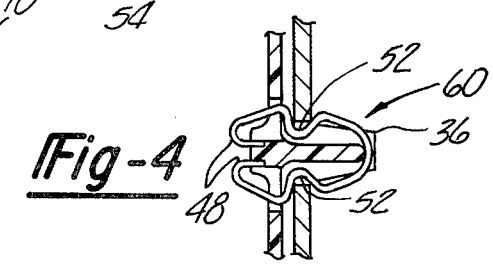

WHEEL TRIM ASSEMBLY

This invention relates to wheel trim assemblies for vehicle wheels and more particularly to a wheel trim arrangement having a retainer system for removably retaining wheel trim on the vehicle wheel.

Various forms of wheel trim and retainers for such wheel trim have been provided. Wheel trim should be suitable for attachment to decorative trim whether the trim is made of plastic or of metal and preferably without requiring separate fasteners to hold the retaining members to the wheel trim. The retaining system should be such that the trim is resiliently and removably maintained on the wheel without marring or otherwise scratching either the surfaces of the wheel or of the wheel trim.

It is an object of the invention to provide a mounting arrangement by which a wheel trim may be releasably mounted on a vehicle wheel.

It is another object of the invention to provide a retaining arrangement for wheel trim in which the retainers act by themselves to maintain attachment to the wheel trim and at the same time afford resilient attachment to the vehicle wheel.

The objects of the invention are accomplished by a wheel trim assembly including a mounting member supporting a plurality of resilient retainer elements formed of piano wire which are supported to extend in planes perpendicular to the mounting member. The retainer elements are mounted on the mounting member through means of a support element formed integrally with and projecting generally perpendicularly from the support element. The retaining elements are deflected upon assembly to the mounting member so that opposite ends fit into grooves preventing axial movement relative to the mounting member. The opposite sides of the retaining element are formed with indentations which receive and grip diametrically opposed portions of mounting holes formed in the wheel of the vehicle. Mounting of the wheel trim on the vehicle wheel is accomplished by aligning the support elements with the associated retainer elements with opening in the wheel and moving the wheel trim assembly axially relative to the wheel so that the retaining elements engage the sides of the holes in the vehicle wheel. Upon removal of the wheel trim assembly from the wheel, the retainer elements remain in position on the wheel trim.

These and other objects, features and advantages of the invention will be apparent from the following detailed description, appended claims and accompanying drawings in which:

FIG. 1 is a plan view of the backside of a hub cap embodying the invention;

FIG. 2 is a cross-sectional view taken on line that extends through both a retainer element and a clearance opening of the hub cap in FIG. 1;

FIG. 3 is a cross-sectional view taken on line 3—3 in FIG. 2;

FIG. 4 is a view similar to FIG. 3 showing a modified form of one element of the retention assembly; and FIG. 5 is a view similar to FIG. 4 showing another modified form of one element of the retention assembly.

Referring to the present wheel trim assembly the invention is embodied in the form of a hub cap designated generally at 10 and including a mounting member 12 to which a cup-shaped decorative cover 14 is attached. The hub cap assembly 10 is adapted for connection to a vehicle wheel 16, a portion of which can be seen in FIG. 2 and which includes a central opening 18 to afford clearance for the axle hub of a vehicle which is not shown. The vehicle wheel 16 has a plurality of uniformly spaced stud receiving openings 20 which receive studs 22 and nuts 24 by which the wheel 16 is secured to the drum of a wheel not shown.

The mounting member 12 is generally annular with a central opening 26 of approximately the same size and in axial alignment with the opening 18 of the wheel 16. As viewed in FIG. 1, the mounting member 12 has a plurality of clearance holes 28 which are disposed in alignment with the wheel retaining nuts 24 when the hub cap assembly 10 is mounted on the wheel 16. Preferably the mounting member 12 is made of plastic material and the cover member 14 is made of a decorative metal in a generally cup-shaped configuration. The outer circumferential lip 30 of the cup-shaped cover 14 forms a groove which is adapted to receive the circumferential outer flange 32 on the mounting member 12 to form a permanent assembly.

The mounting arrangement by which the hub cap 10 is secured to the wheel 16 includes a plurality of support elements 36 uniformly spaced on a circle disposed generally in an area of the nut clearance openings 28. The support elements 36 act to hold resilient retaining elements 40.

As seen in FIG. 3 the retaining element 40 is made of piano wire and has an irregular configuration which is generally U-shaped. The retainer 40 is resiliently supported on the mounting member 12 through means of the support elements 36 which act to hold the retainers 40 in tangential planes which would extend perpendicular to the mounting member 12 and parallel to the axis of wheel 16. The support elements 36 project radially inwardly toward the vehicle wheel 16 and are disposed substantially perpendicular to the back face of the mounting member 12. Each support element 36 has a groove 42 disposed on opposed sides of the support element and joined by a groove portion 44 extending across the end of the support elements 36 and joining the grooves 42. The support elements 36 are also provided with a pair of seat recesses 46 which are adapted to receive the ends of turned portions 48 of the retainers 40. The retainer 40 is generally U-shaped and its bight 50 is received in the groove 44 at the outer end of the support element 36. The legs of the U-shaped member 40 are indented toward each other at 52 intermediate the opposite ends of the U-shaped member. The indented portions 52 are received in the grooves 42 at the sides of the support element 36.

Elongated holes 54 are formed at opposite sides of the support element 36 to receive the opposite legs of the U-shaped retainer element 40. In the position shown in FIG. 3, the retainer element 40 is secured on the support element 36 by having bight 50 disposed in the groove portion 44 and with the indentations 52 disposed in the side grooves 42. The ends formed at the turned portions 48 of the legs of the U-shaped retainer 40 are disposed in the seat recesses 46 in such a manner that axial movement of the retainer is prevented. The indentations 52 are disposed in the side grooves 42 and resist turning movement of the retainer 40 relative to the support element 36. Projecting portions adjacent the indentations 52 project radially of the mounting member from opposite sides of the support elements 36.

In the position seen in FIG. 3 the opposed indentations 52 are adapted to engage diametrically opposed edges of openings 56 formed in wheel 16, only one of which is seen in FIG. 3 but which are disposed in uniformly spaced relationship intermediate the stud receiving holes 28.

To attach the hub cap assembly 10 to the wheel 16, the mounting member 12 is positioned so that the support elements 36 with the associated retainers 40 are aligned with the openings 56 in the wheel after which axial movement of the hub cap 10 relative to the wheel 16 serves to deflect the retainers 40 so that the indentations 52 engage the diametrically opposed edges of the holes 56 in the wheel 16.

Removal of the wheel trim in the form of a hub cap assembly is accomplished by prying the lip 30 axially away from the face of the wheel 16 which causes the retainer elements 40 to deflect and permit removal of the support elements from the mounting holes 56. Upon removal of the wheel trim assembly the retainer elements 40 remain with the wheel trim. However, if for some reason it is necessary to remove the retainer member 40 it is accomplished by spreading the leg portions 48 apart sufficiently to clear the ends of turned portions 48 from recesses 46 after which the retainer element can be pulled axially, to the right as viewed in FIG. 3 to remove the retainer element 40 from the wheel trim.

Assembly of the retainer elements 40 to the mounting member 12 is accomplished by aligning the leg portions 48 with opposite grooves 42 in the support element 36 and thereafter pushing the resilient retainer 40 so that its legs are spread slightly by the portions 48 which act as cams and pass through the pair of elongated openings 54. When the ends of portions 48 which can be considered as cams come into alignment with the recesses 46, the retainer element will return to its formed shape so that the ends of turned portions 48 become seated in recesses 46. This prevents axial movement of the retainer element 40 relative to the support member 36.

FIGS. 4 and 5 illustrate modified forms of the retainer element which are indicated at 60 and 70 and correspond in many respects to the retainer 40 seen in FIG. 3. Although the leg portions of the retainer 60 and 70 are slightly differently formed they both have bight portions 50, opposed grooves 42 and turned portions 48 with ends which fit in recesses 46 to prevent axial movement of the retainers 60 or 70 relative to the support elements 36.

A wheel trim assembly has been provided in which resilient retainer elements act to hold the retainer elements in position relative to the wheel trim and also coact with the wheel of the vehicle to hold the wheel trim assembly on the wheel. The retainer element is made of resilient piano wire and is mounted on a mounting member preferably made of plastic.

The embodiments of the invention in which an exclusive property or privilege is claimed are defined as follows:

1. A wheel trim assembly for detachable attachment to the outer face of a vehicle wheel having a plurality of holes, the combination of; a mounting member forming a portion of a wheel trim member, a plurality of support elements extending axially and perpendicular to said mounting member, a plurality of resilient retainer elements detachably supported from each of said support elements, each of said retainer elements being generally U-shaped with a pair of legs joined to and spaced apart by a bight portion, said legs and bight portion being disposed parallel to the axis of said wheel with said bight portion engaging one end of the associated support element and said legs having free end portions engaging another end of the associated support element to maintain said retainer elements axially fixed relative to said mounting member, said pair of legs of each of said retainer elements having oppositely facing indentations to resiliently engage diametrically oppposed edges of said holes to releasably maintain said mounting member in position relative to said wheel.

2. The combination of claim 1 wherein said retainer elements are made of spring-like wire.

3. The combination of claim 1 wherein said support element has grooves at opposite ends thereof to receive portions of said retainer element therein.

4. The combination of claim 1 wherein said leg portions form cam surfaces engageable with opposite sides of said support elements to guide said retainer elements into position on said support element.

5. The combination of claim 1 wherein said mounting member has openings at opposite sides of said support elements to receive the legs of said U-shaped retainer elements.

6. The combination of claim 5 wherein said legs of said retaining elements have turned portions forming cams engageable with said support elements and deflecting said legs apart upon movement of said retaining elements relative to the associated support elements during assembly with said mounting member to enter said opening, said turned portions being returnable to their normal position to engage one end of the associated mounting element and to prevent axial movement relative thereto.

7. The combination of claim 6 wherein said turned portions extend axially of said mounting member to resiliently resist axial displacement of said retaining elements relative to said mounting element.

8. The combination of claim 1 wherein said retainer elements have projecting portions adjacent said indentations extending radially relative to said mounting member from opposite sides of the associated one of said support elements for engagement with said face of said vehicle wheel.

9. The combination of claim 1 wherein said support elements have opposed grooves in said opposite sides of said support elements and wherein said indentations formed in said retainer elements are disposed in said grooves to prevent twisting of said retainer elements relative to the associated ones of said support elements.

* * * * *